Oct. 17, 1950 F. E. SANBORN 2,525,951
UNIVERSAL FLUID COUPLING
Filed Nov. 22, 1946 3 Sheets-Sheet 1
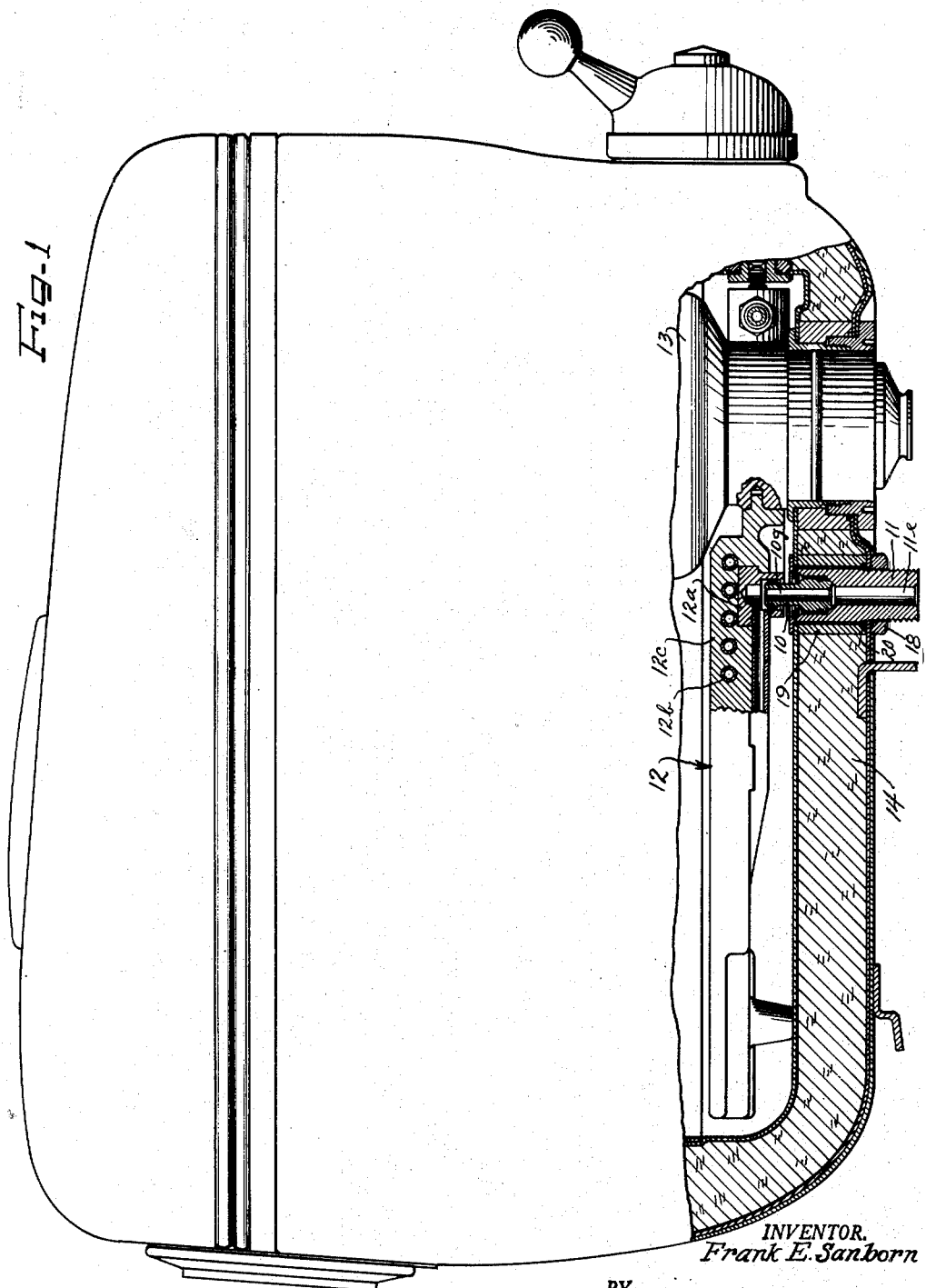
INVENTOR.
Frank E. Sanborn
BY
ATTYS Oct. 17, 1950  F. E. SANBORN  2,525,951
UNIVERSAL FLUID COUPLING
Filed Nov. 22, 1946  3 Sheets-Sheet 2
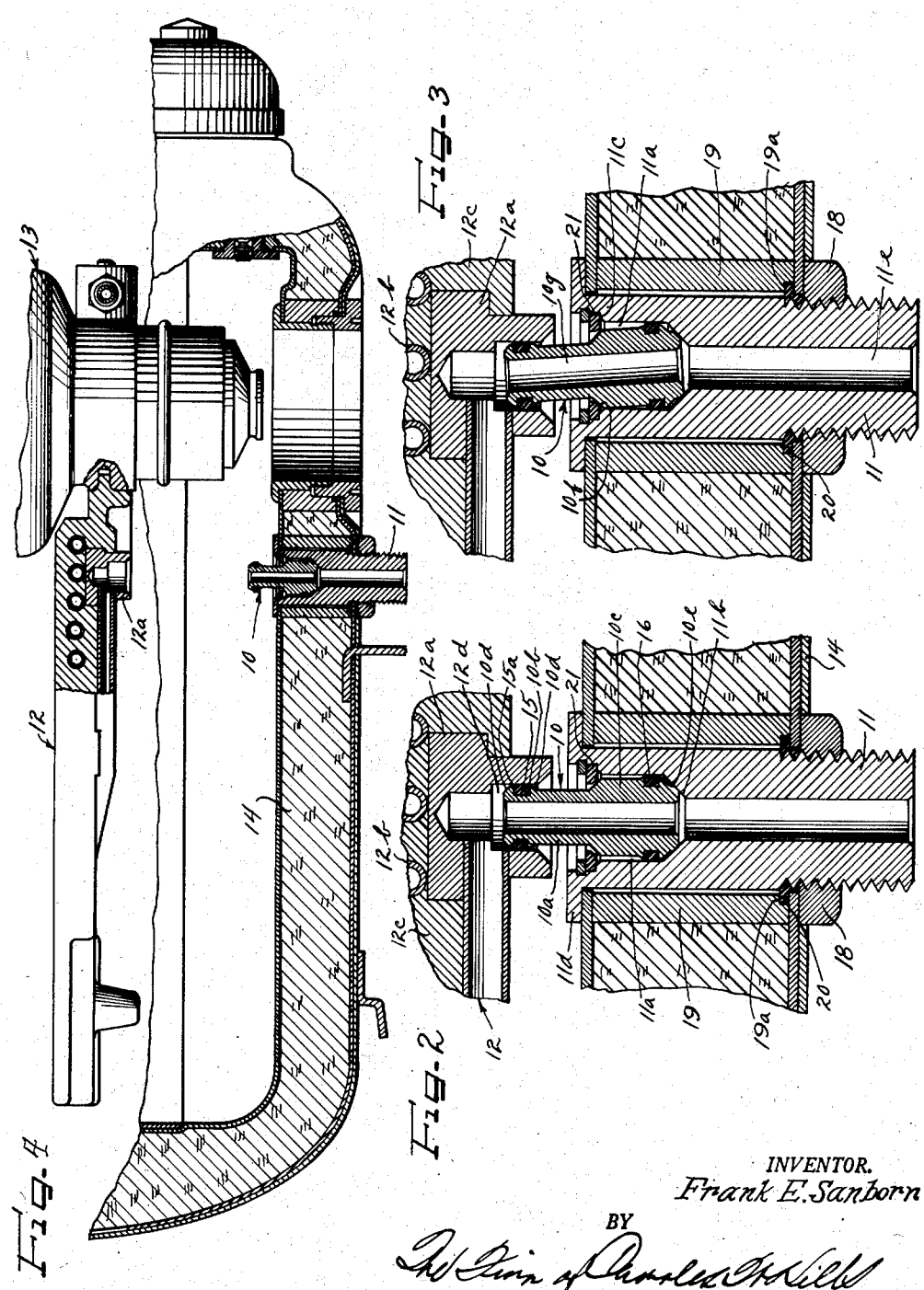
INVENTOR.
Frank E. Sanborn
BY
ATTYS Oct. 17, 1950  F. E. SANBORN  2,525,951
UNIVERSAL FLUID COUPLING
Filed Nov. 22, 1946  3 Sheets-Sheet 3
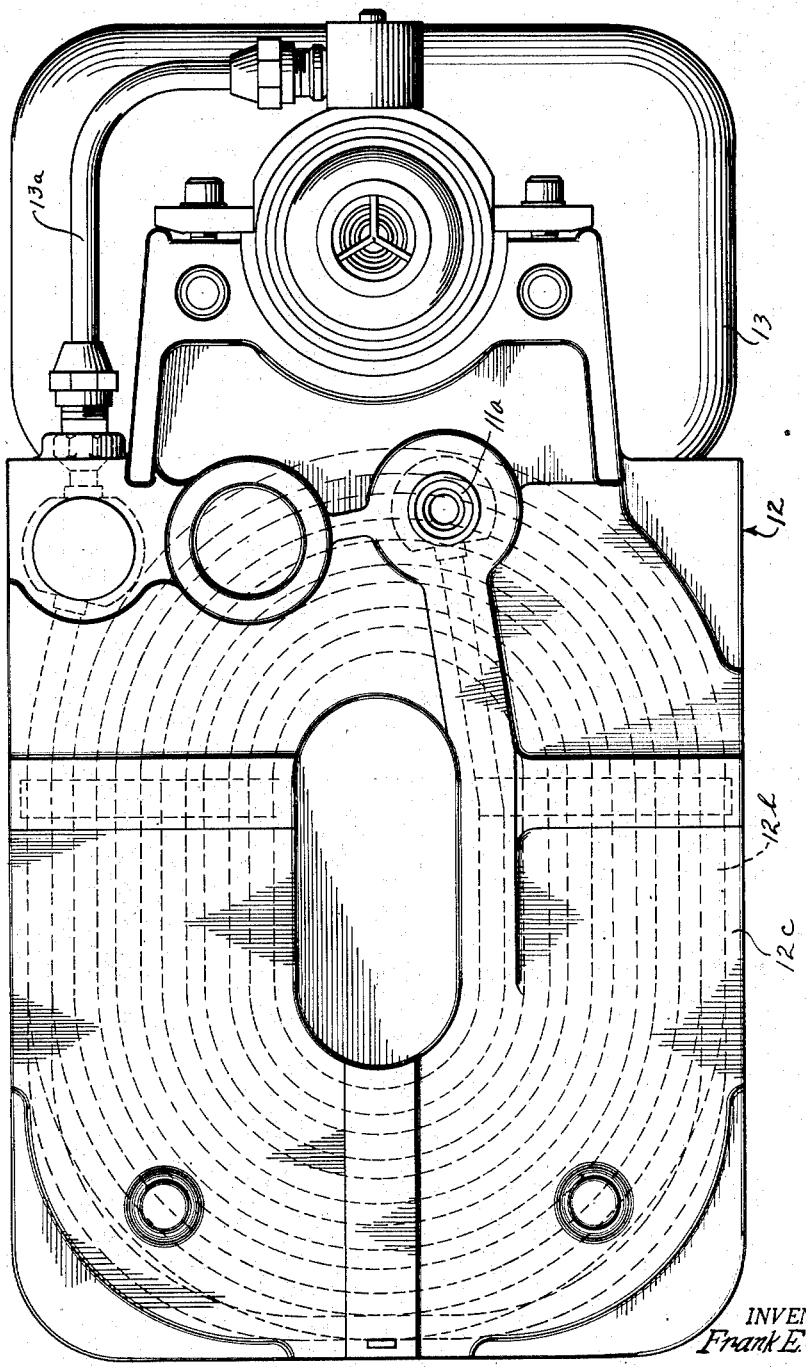
INVENTOR.
Frank E. Sanborn
BY
ATTYS Patented Oct. 17, 1950

2,525,951

UNITED STATES PATENT OFFICE 2,525,951

UNIVERSAL FLUID COUPLING

Frank E. Sanborn, Chicago, Ill., assignor to The Dole Valve Company, Chicago, Ill., a corporation of Illinois Application November 22, 1946, Serial No. 711,488

5 Claims. (Cl. 285—5)

1

This invention relates to improvements in universal fluid couplings and particularly to improvements in the type of fluid coupling used to connect the carbonated liquid supply line to the cooling coil in a soft drink dispenser unit.

While the device of this invention is generally useful in connecting any lines in which a fluid is flowing, it is particularly adapted for connecting the supply line of the carbonated liquid under pressure to the cooling coil in a soft drink dispenser unit and will hereinafter be specifically described for such usage. It should be understood, however, that the invention is not limited to use in a drink dispenser unit, although especially advantageous for use in such a unit.

In connecting the outside supply line of the carbonated liquid to the inside cooling coil in a drink dispenser, it is desirable that a sealing contact be made in order that the liquid under pressure cannot escape or be diluted by the cooling water around the coils. It is also desirable that this sealing connection be so arranged that it may be quickly and easily made and broken for maintenance purposes. Furthermore, in most dispenser units the cooling coils and the dispenser head to which they are rigidly connected both extend downwardly through individual openings in the lower wall of the casing of the dispenser. Since the coils are normally positioned in the lower part of the cooling chamber where there is little working space it is preferable that the coils be attached to the dispenser head before either unit is placed in the cooling chamber. It will be readily appreciated that the manufacturing tolerances of both the coil assembly and the dispenser head must be held very close in order that, upon assembly, their projecting outlet connections will align themselves into their respective openings in the casing. It is therefore desirable, to prevent high manufacturing costs, that one of these openings be equipped with a self-aligning universal coupling member which will permit the distance between the downwardly extending member of the assembly to vary slightly and still form sealing contacts at both openings.

It is therefore an object of this invention to provide a universal fluid coupling particularly adapted to meet the aforesaid conditions.

It is another object of this invention to provide a simple universal fluid coupling member that will connect two fluid lines in sealed relation.

It is a further object of this invention to provide a universal fluid coupling that may be quickly positioned in sealing contact with a fluid line by a simple, push-on movement of the line connector member.

It is another and still further object of this invention to provide a universal fluid coupling that is economical to manufacture, and easy to install and maintain.

According to the general features of this invention there is provided a coupling member which has a seal ring fitted on its outer surface near each end, said seal rings being adapted to maintain sealed contact with the inner walls of connector members.

Another feature of this invention is the provision of a coupling member which has a reduced body portion to permit a relatively large degree of universal action.

A further feature of this invention is the provision of an adjustable member which provides a socket for the lower end of the universal coupling and also makes a sealed contact with the lower wall of the dispenser casing.

Other and further objects and features of this invention will be apparent to those skilled in the art from the following detailed description of the annexed sheets of drawings which illustrate one embodiment of the invention.

On the drawings:

Figure 1 is a side elevational view, partly in section and partly broken away, of a universal fluid coupling embodying the features of my invention installed in a dispenser unit.

Figure 2 is a fragmentary sectional view taken through the universal coupling of this invention and through the adjacent parts of the dispenser casing and of the cooling coil assembly.

Figure 3 is a fragmentary sectional view similar to that of Figure 2 but showing the universal coupling in a tilted position according to the principles of this invention.

Figure 4 is an exploded fragmentary elevational view, partly in section and partly broken away, of the assembled cooling coil and dispenser head just prior to being positioned in the dispenser casing.

Figure 5 is a plan view looking upwardly at the bottom of the assembled coils and dispenser head.

As shown on the drawings:

The apparatus of my invention comprises a coupling 10 which is adapted, as shown in Figure 1 of the preferred embodiment, to join in sealed relation the supply line connector 11 of a carbonated liquid and an inlet connector 12a of a cooling coil assembly 12. In a typical installation the cooling coil assembly 12, including a coil 12b imbedded in a heat transfer block 12c, is connected (Figure 5) to a dispenser head assembly 13 by tubing 13a. Both the dispenser head assembly 13 and the supply line connector 11 are positioned in openings in an insulated casing 14 of the dispenser assembly. The carbonated liquid enters the dispenser through the connector 11, passes through the cooling coil assembly 12 and then is mixed with syrup in the dispenser head 13 from which the mixed cold drink is drawn.

The coupling 10 (Figure 2) includes a substantially cylindrical central portion 10a, an enlarged upper section 10b and a lower portion 10c of still greater diameter. The upper portion 10b is adapted to be positioned in an opening 12d of a cooling coil inlet connector 12a, making sealing contact with the inner wall of this opening by means of a seal ring 15 which is made of a resilient material such as rubber, synthetic plastic or the like, and is positioned in a groove in the upper portion 10b. Sealing contact with the inner wall is effected by a projection 15a of the seal ring 15 which extends outwardly beyond the surface of the coupling 10.

The seal ring 15 is the only part of the upper portion 10b of the coupling 10 that contacts the inner wall of the opening 12d and it is this seal ring that will automatically adjust its position when the coupling 10 is tilted in its universal action. In order to permit a maximum amount of tilting of the coupling 10 the edges 10d on either side of the seal ring 12 are beveled. Thus the coupling 10 may be positioned in sealing contact with the inlet connector 12a for pivoting action therein.

Sealing contact between the lower portion 10c of the coupling 10 and the carbonated water supply line may be effected in a similar manner. A resilient seal ring 16 of rubber-like material is positioned in a groove cut in the lower portion 10c protruding outwardly from the sides thereof to make a sealing contact with the inner wall of an opening 11a in the upper part of the supply line connector 11. In order to permit a maximum of tilting of the coupling 10 the lower portion 10c thereof is reduced in diameter on either side of the seal ring 16. The lower edge 10e of the coupling 10 is beveled to seat tightly on the slanted lower wall 11b of the opening 11a.

As best seen in Figure 3, if the coupling 10 is tilted due to misalignment of the cooling coil with the dispenser head assembly, it will pivot to one side, as for instance to the left, where an upper corner 10f acts as a limit to the tilting movement due to its contact with the wall of the opening 11a.

A passageway 10g is provided lengthwise through the center of the coupling 10.

The supply line connector 11 has an upper annular flange 11d which rests on one side of the casing 14 and is pulled downwardly thereon by means of a nut 18 which is adapted to screw onto the lower threaded portion of the connector 11 against the underside of the casing 14. In order to prevent the wall of the casing 14 from collapsing when the connector 11 is drawn downwardly and to provide a relatively sealed passageway through the casing, a spacer member 19 is positioned between the walls.

The escape of liquid coolant around the connector 11 is prevented by use of a seal ring 20 which is disposed between the threaded portion of connector 11 and a recess 19a in the lower part of spacer member 19.

For ease in installing the coil and dispenser head assembly in the dispenser casing 14, it is desirable that the lower end of universal coupling be secured in the connector 11 while the upper end projects upwardly for removable push-on engagement with the cooling coil inlet connector 12. In Figure 4 the coupling 10 is shown secured in the supply line connector 11 just prior to the lowering of the coil and dispenser head assembly into position.

In order to secure the coupling 10 in the supply line connector 11, I have provided a washer 21 which is positioned around the coupling 10 on a shoulder 11c of the connector 11. A snap-ring 22, disposed in a groove in the upper part of opening 11a, bears down on the top of the washer 21 holding it on the shoulder 11c. Since the body of the lower portion 10c of coupling 10 is larger than the opening in the washer 21, the coupling is also prevented from moving upwardly.

A passageway 11e is disposed lengthwise through the center of the supply line connector 11. This passageway 11e communicates with the passageway 10g of the coupling 10 and thereby provides a continuous channel between the supply line, and the cooling coil inlet connector 12.

From the foregoing description it is evident that there is provided a simple, effective coupling that has a universal pivoting action which will permit the dimension between outlets of an assembled unit to vary considerably without preventing the positioning of the members in sealed engagement with each other.

This universal coupling is economical to make, easy to install and may be used where any two liquid lines which are not in exact alignment must be joined or where service requirements might possibly cause the lines to be slightly displaced in operation.

It will, of course, be understood that various details of construction may be varied throughout a wide range without departing from the principles of this invention, and it is, therefore, not the purpose to limit the patent granted hereon otherwise than necessitated by the scope of the appended claims.

I claim as my invention:

1. A coupling for connecting two tubular flow passages comprising a tubular body portion having a recessed groove adjacent each end, resilient seal rings disposed in said grooves having outer ring portions projecting radially from said grooves, said seal rings being of a diameter to sealingly engage the inner walls of the tubular flow passages in which they are inserted.

2. A coupling for connecting two tubular flow passages comprising a tubular body portion having a recessed groove adjacent each end and resilient seal rings disposed in said grooves having outer ring portions projecting radially outwardly from said body portions, said seal rings being of a diameter to sealingly engage the inner walls of the tubular flow passages in which they are inserted, said tubular body members having a reduced external diameter portion between said seal rings to permit pivoting of the body member on said seal rings without interference of the body member with the walls of the tubular flow passages.

3. A coupling for connecting two superimposed tubular flow passages comprising a connector threaded at one end for securement to the lower tubular flow passage having a central passage with a shoulder portion formed at the upper end thereof, a tubular pivotable body member having one end bottomed against said shoulder in said connector and the other end projecting upwardly above said lower tubular flow passage member, said body member having recessed grooves adjacent each end and seal rings disposed in said grooves having outer portions projecting radially outwardly of said body member, said seal rings at the lower end of said body member having an external diameter to sealingly engage the internal wall of said connector and said seal ring at the upper end of said body member having an external diameter to sealingly engage the internal wall of the upper tubular flow passage as it is pushed downwardly thereover.

4. A coupling for connecting two superimposed tubular flow passages comprising a connector threaded at one end for securement to the lower tubular flow passage and having a central passageway with a shoulder portion formed at the upper end thereof, a tubular pivotable body member having one end bottomed against said shoulder and the other end projecting upwardly above said lower tubular passage member, said body member having recessed grooves adjacent each end, seal rings disposed in said grooves having outer portions projecting radially outwardly of said body member, said seal ring at the lower end of said body member having an external diameter to sealingly engage the internal wall of said connector, and said seal ring at the upper end of said body member having an external diameter to sealingly engage the internal wall of the upper tubular flow passage as it is pushed downwardly thereover, said tubular body member having a portion of reduced diameter between said seal rings to permit pivoting of the body member on said seal rings without interference of the body member with the walls of the tubular flow passages.

5. A coupling for connecting two tubular flow passages comprising a tubular body portion having a recessed groove adjacent each end and resilient seal rings enclosed in said groove having outer link portions projecting radially outwardly from said body portions, said seal rings being of a diameter to sealingly engage the inner walls of the tubular flow passages in which they are inserted and to provide a pivoting clearance between the inner walls of the passages and said body portion.

FRANK E. SANBORN.

REFERENCES CITED

The following references are of record in the file of this patent:

UNITED STATES PATENTS

| Number | Name | Date |
| --- | --- | --- |
| 128,506 | Puffer | July 2, 1872 |
| 772,081 | Bernard | Oct. 11, 1904 |
| 2,121,841 | Tweed | June 28, 1938 |
| 2,344,698 | Howe | Mar. 21, 1944 |
| 2,398,399 | Alexander | Apr. 16, 1946 |